United States Patent
Meyrowitsch

(10) Patent No.: US 6,494,720 B1
(45) Date of Patent: Dec. 17, 2002

(54) METHODS FOR OBJECTIFICATION OF SUBJECTIVE CLASSIFICATIONS

(76) Inventor: Jan Meyrowitsch, Rialtovej 12, Copenhagen S DK-2300 (DK)

( * ) Notice: Subject to any disclaimer, the term of this patent is extended or adjusted under 35 U.S.C. 154(b) by 0 days.

(21) Appl. No.: 09/308,205
(22) PCT Filed: Nov. 14, 1997
(86) PCT No.: PCT/DK97/00523
§ 371 (c)(1),
(2), (4) Date: May 13, 1999
(87) PCT Pub. No.: WO98/22904
PCT Pub. Date: May 28, 1998

(30) Foreign Application Priority Data

Nov. 14, 1996 (DK) .............................................. 1287/96

(51) Int. Cl.[7] .............................................. G09B 17/00
(52) U.S. Cl. ........................ 434/322; 434/118; 434/262
(58) Field of Search ................................. 434/236, 238, 434/237, 234, 258, 350, 362, 262, 322

(56) References Cited

U.S. PATENT DOCUMENTS

| | | | |
|---|---|---|---|
| 4,867,685 A | * | 9/1989 | Brush et al. ................. 434/234 |
| 4,895,518 A | | 1/1990 | Arnold et al. |
| 5,002,491 A | * | 3/1991 | Abrahamson et al. ....... 434/350 |
| 5,299,284 A | | 3/1994 | Roy |
| 5,344,324 A | * | 9/1994 | O'Donnell et al. .......... 434/258 |
| 5,503,561 A | | 4/1996 | Cohen |
| 5,911,581 A | * | 6/1999 | Reynolds et al. ............ 434/236 |
| 6,053,739 A | * | 4/2000 | Stewart et al. ............... 434/236 |

* cited by examiner

Primary Examiner—Joe H. Cheng
Assistant Examiner—Kathleen M Christman
(74) Attorney, Agent, or Firm—Merchant & Gould P.C.

(57) ABSTRACT

The method is based on consensus analysis of classifications at the object level carried out by learning Systems. To determine persons or groups of persons ability to analyze details, e.g. in visual objects, digitized images of the objects are feed into a computer, where each image is assigned a number of characteristics, N out of Q possible. Some of the characteristics in the images are being selected, after which a person is set to identify the images by determination of the characteristics. The same image in a series of images is presented for the person several times, and if the person is capable to distinguish the images from each other, and furthermore reach the same results with the same images, then the person possess good abilities for type determination of reference signals, e.g. in form of images. The invention is suitable to identify persons, who are gifted for analysis of e.g. biological samples, such as images of semen samples, cancer cells, etc.

6 Claims, 7 Drawing Sheets

Visual Knowledge Transfer via Intranet

Figure 1:
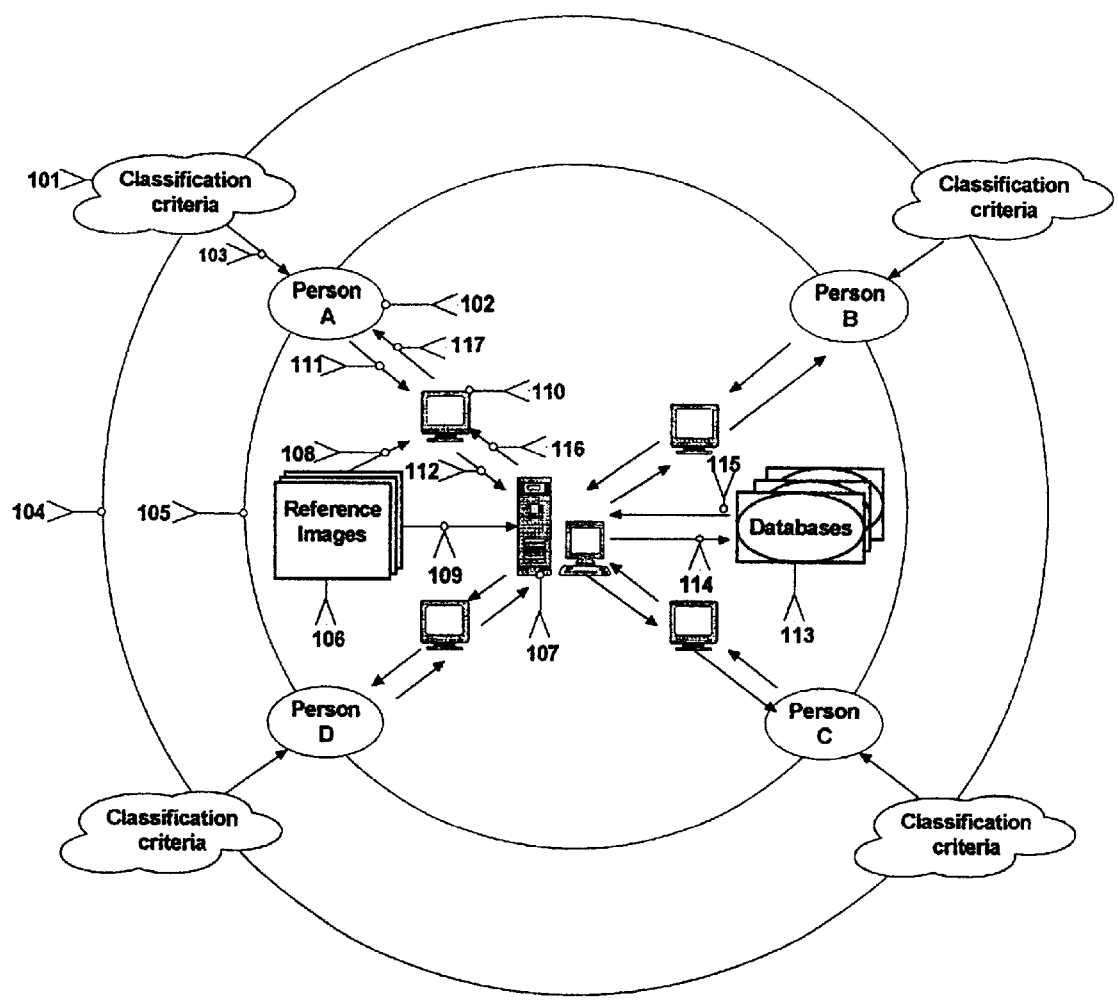

Example on contemporary displays of classified objects and the respective classifications, here shown for simplicity as the classification types A, B, and C.

| Example on registration, counting and summation of type specific object classifications to calculate the percentage of visual object recognition as a function of the percentage repeated classifications |
|---|

| 3 Classified objects: $O_1$ to $O_3$; <br> 3 Classified sets: $S_1$ to $S_3$ <br> 3 Types of objects: $T_1$ to $T_3$ | Processes: <br> C= Classification <br> S= Summation |
|---|---|

W = Consensus Winner for the specified type. By equal attained distribution in percentages among several classification types, that classification type may win as here shown, which are noted at the farthest to the left in the table. Other types of rules to determine even results may be defined.

| Set no. | | | | $S_1$ | | | | | | $S_2$ | | | | | | $S_3$ | | |
|---|---|---|---|---|---|---|---|---|---|---|---|---|---|---|---|---|---|---|
| Process | C | | | S | | | C | | | S | | | C | | | S | | |
| Object No. | $T_1$ | $T_2$ | $T_3$ | $T_1$ | $T_2$ | $T_3$ | $T_1$ | $T_2$ | $T_3$ | $T_1$ | $T_2$ | $T_3$ | $T_1$ | $T_2$ | $T_3$ | $T_1$ | $T_2$ | $T_3$ |
| $O_1$ | X | | | 1 | | | X | | | 2 | | | X | | | 2 | 1 | |
| $O_2$ | X | | | 1 | | | | X | | 1 | 1 | | | | X | 1 | 1 | 1 |
| $O_3$ | | X | | | 1 | | | X | | | 2 | | X | | | | 3 | |

| | In total | | | W | | |
|---|---|---|---|---|---|---|
| Object No. | $T_1$ | $T_2$ | $T_3$ | $T_1$ | $T_2$ | $T_3$ |
| $O_1$ | 66 | 33 | | 2 | | |
| $O_2$ | 33 | 33 | 33 | 1 | | |
| $O_3$ | | 100 | | | 3 | |

Table 1

| Calculation of the type-specific object recognition for those classified, consensus-winning objects, as a function of the percentage repetition, e.g. as here divided into the following intervals: |
|---|

| Percentage Repeated Classifications | $T_1$ | $T_2$ | $T_3$ | $T_1$ | $T_2$ | $T_3$ |
|---|---|---|---|---|---|---|
| 0 - 33 percentage | 2 | 1 | 0 | 100 | 100 | 0 |
| 34 - 66 percentage | 1 | 1 | 0 | 50 | 100 | 0 |
| 67 - 100 percentage | 0 | 1 | 0 | 0 | 100 | 0 |

Table 2

FIG. 5

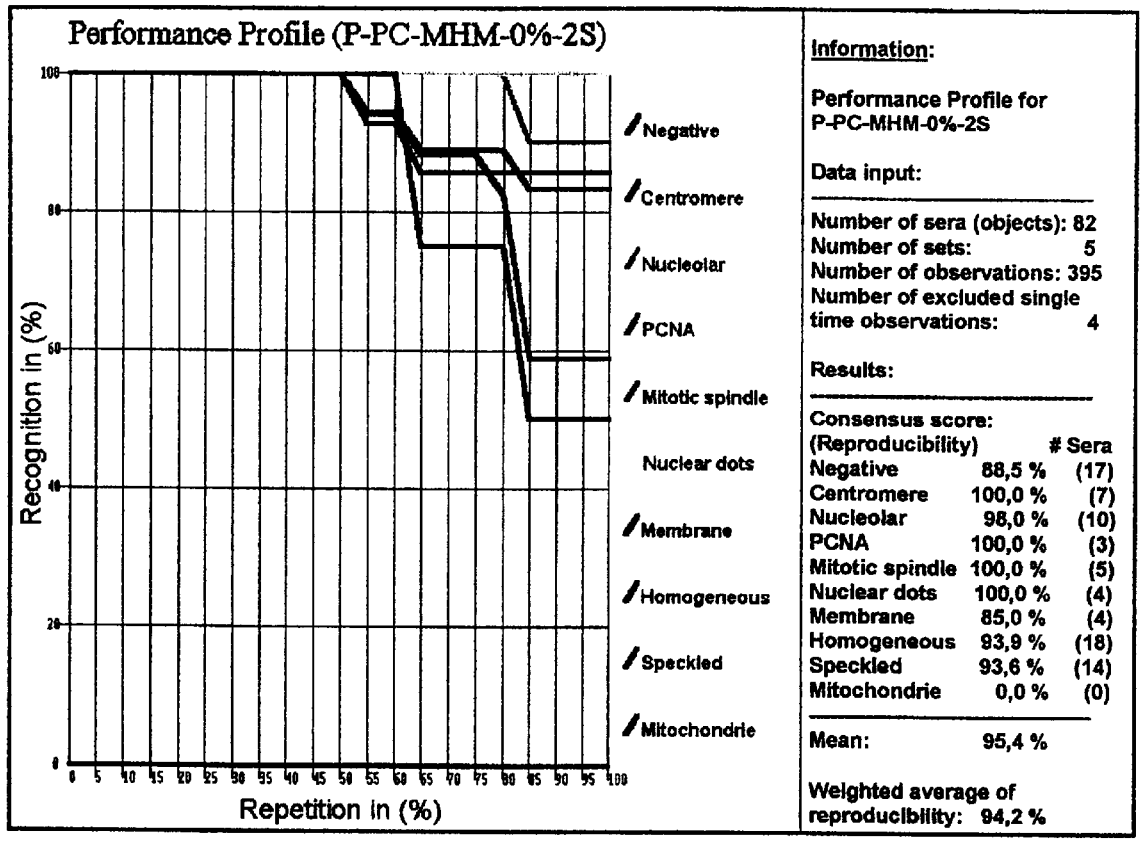

Determination of the classifying ability for the person MHM is carried out on basis of a consensus set, which is calculated on basis of 5 classifications of the same 82 images of microscopy samples.

The obtained results are calculated and indicated as the percentage area under respectively each of the 9 type-specific curves (performance profiles).

For the type "Mitochondria", no images were classified as this type.

The curves are produced by successively counting the percentage number of type-identified objects, which is indicated as "Recognition in %), as a function of the percentage indicated number of classified sets, indicated as "Repetition in %".

The visual recognition ability as here for the person MHM to recognise all the patterns is calculated partly as a arithmetic mean, and partly as a weighted average (Weighted Average Reproducibility) in relation to the number of type-specific sera, which are classified.

It is this weighted average, which represent the reproducibility of learning systems to carry out type-specific object recognition.

FIG. 6

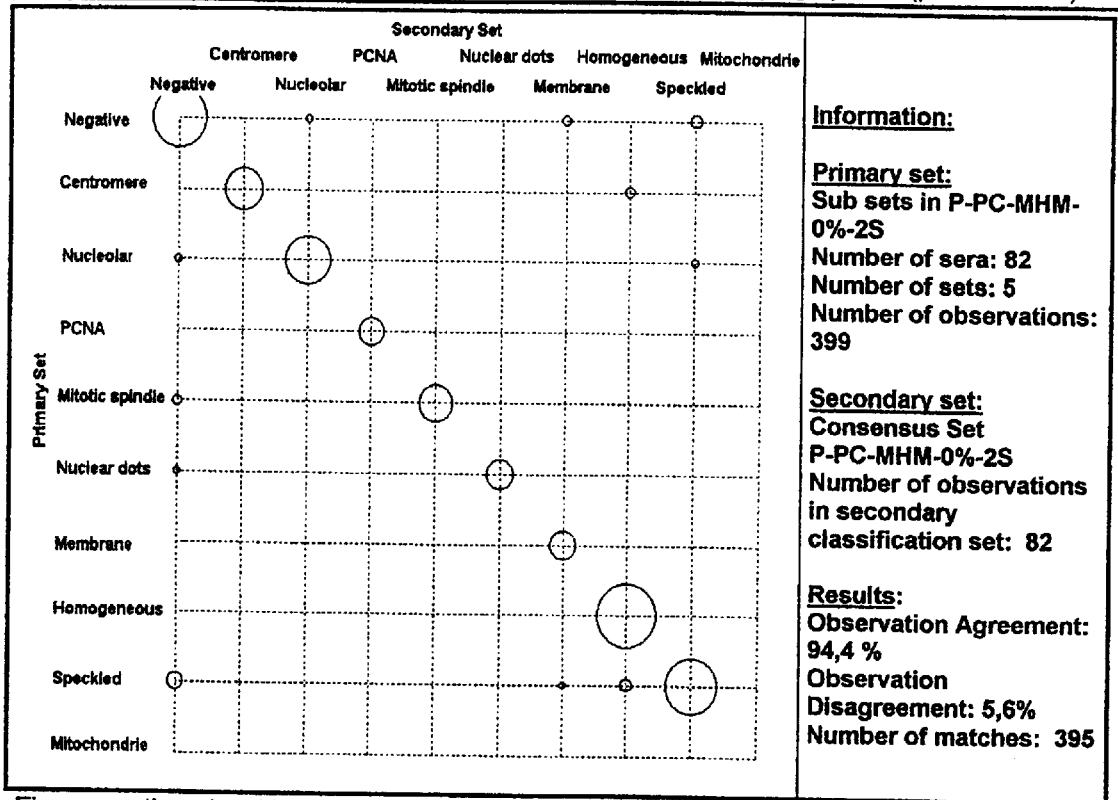

Five repeating classifications of the same 82 objects (sera) have been carried out. However, 11 classifications have been skipped ((5 x 82) – 399) = 11. Out of these 399 classifications, in 395 classifications, the objects have been classified at least twice.

The consensus set has been calculated as the votes of the majority for each of the 82 classified objects. For instance, if an object have been classified three times as type A and twice as type B, then the object in the consensus set will be classified as type A. In case, an object is classified as two different types, an equally number of times, then the object will be classified as that type, which are defined most to the left and most to the top in the scheme.

The shown example demonstrates intra-system variations for the given classifications, while the sizes of the shown circles in the diagonal north-west / south-east in the diagram represent the certainty or agreement of the system with itself (here 94.4 %), while the sizes of the shown circles outside this diagonal represent the uncertainty or disagreement of the system with itself (here 5.6 %).

Similar variation analysis may be carried out for consensus set, which have been calculated on basis of classifications executed by different systems (inter-system variations), groups of systems (inter-group) variations, and centre of groups (intra-centre variations).

FIG. 7

METHODS FOR OBJECTIFICATION OF SUBJECTIVE CLASSIFICATIONS

DESCRIPTION

The invention relates to a method for determination by consensus analysis the capability for learning systems to classify digitised signals, for instance digitised images of objects. In addition, the invention includes the utilisation of this method in networking as illustrated in FIG. 1 for improvement of standardisation, education and certification in classifying digitised signals.

The method is applicable to determine all type of human, recognition capabilities. Moreover, as described in claim 1, the method is useful for any type of biological or technological, learning systems. The classifying systems may be separated units, organised as group of units, or constituting a centre of several groups of units. For exemplification, the invention is explained in relation to determination of the human capability for visual recognition of objects in digitised images.

Thus, within the healthcare sectors, large numbers of visual inspections are carried out, in particular for diagnostically and scientifically purpose. Many of these visual analyses are carried out on biological samples, which are analysed automatically by image analysis for instance digitised images recorded by videomicroscopy or scanning techniques. In many cases, the image analysis can be carried out by rule-based, digital image analysis. However, visual inspections are often necessary to be carried out on a complex, knowledge-basis by technicians, medical doctors, or other trained personnel. Obviously, it is mandatory, that a visual inspection will be carried out carefully and with sufficient experience to determine details in an image. Often, these types of images are very complex, such as images of sperm cells, cancer cells, or similar objects.

So far, more experienced personnel have educated less trained persons, who then had to carry out the visual inspection analysis on their own. Moreover, by use of known methods to determine the reproducibility in visual perception, objects in samples are classified by e.g. microscopy and morphological classification by e.g. manual count of different types of human spermatozoa. Thereby, any mistaking between different types of objects can statistically not be resolved.

As mentioned, it is extremely important, that e.g. interpretation of medical images is carried out with the greatest care. It is however well known that visual interpretations of complex objects often vary considerable between persons as reflected in high intra-person and inter-person variations.

Until now, no method has yet been developed to analyse the capabilities of persons to interpret digitised images of objects, i.e. at the object level. In particular, no method has yet been practised to determine to which extent some persons or groups of persons are special gifted for recognising special types of objects.

More specifically, the invention relates to a statistical, consensus method, to identify e.g. persons or groups of persons, who are particular, qualified to classify different types of specified objects in digitised images as defined by the classification criteria. This method is embodied by implementation of a database and a statistical software system in a computer environment. Thereby, the method is enabled both by displaying objects in digitised images, by a user-interface unambiguous to connect selected object with determined classification type, and by the simultaneous displaying of the objects and the determined types of classifications. By classifying objects in the reference images several times, thereby constructing several classification sets, these sets can then be used for calculating a consensus set.

For standardisation, education and quality assurance in classifying objects in digitised images it is therefore necessary to identify and employ persons or groups of persons, who posses a reproducible high visual perception classify objects.

A reproducible, visual perception then implies that every time, e.g. a person or groups of persons are classifying the same objects in the same reference image, the objects are classified as the same types.

The invention provides by statistical, consensus analysis so-called type-specific performance profiles, in which the percentages of recognition capability are histogram functions of the percentage of repeated classifications for each defined type of object, as described in claim 1. Thus, as shown in FIG. 6, the areas in percentage under each histogram represent the type-specific object recognition, and the weighted average of all the type-specific performance profiles (WAR) represent the person's performance to recognise the specified types of objects.

Figure 2:
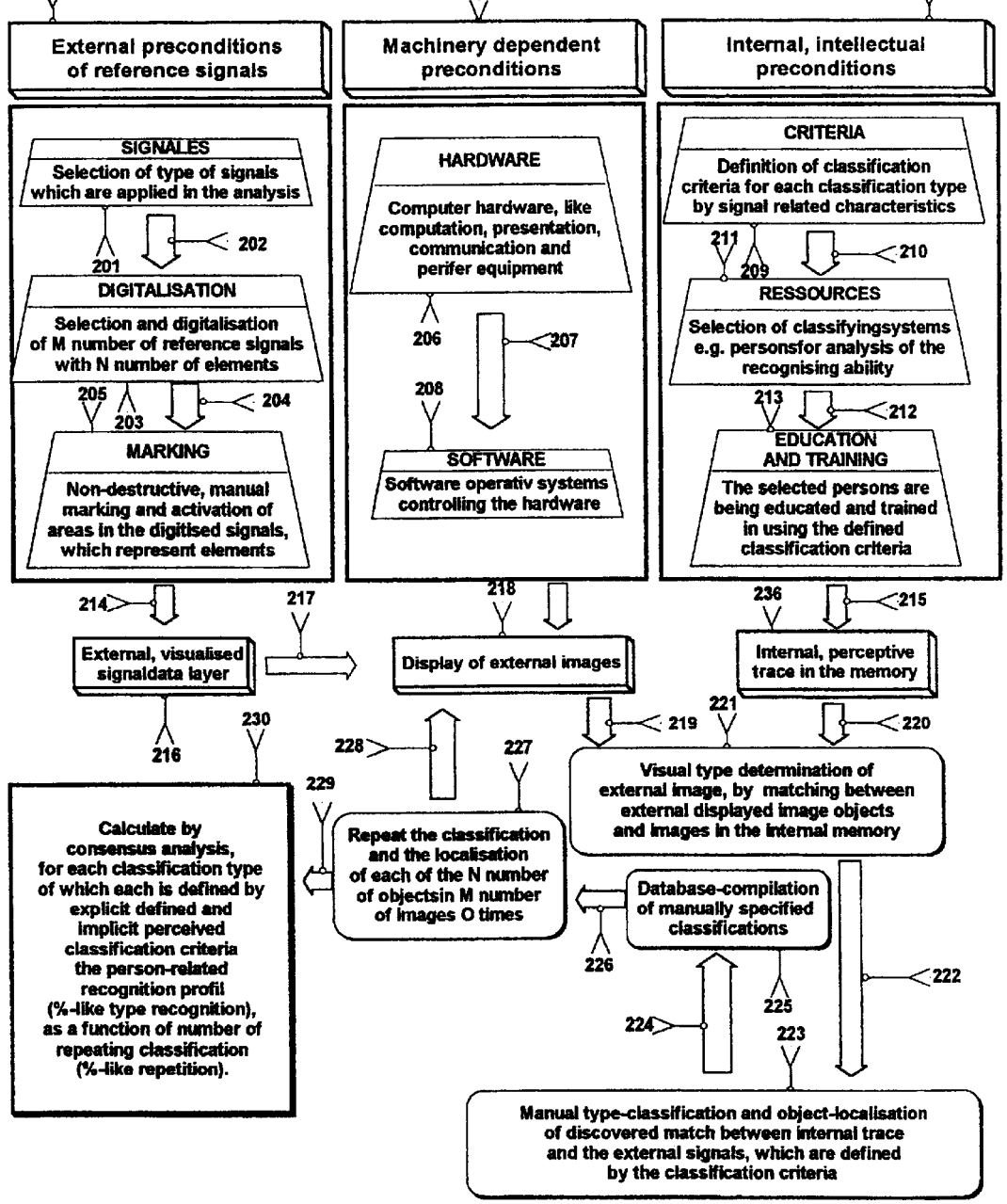
Figure 3:
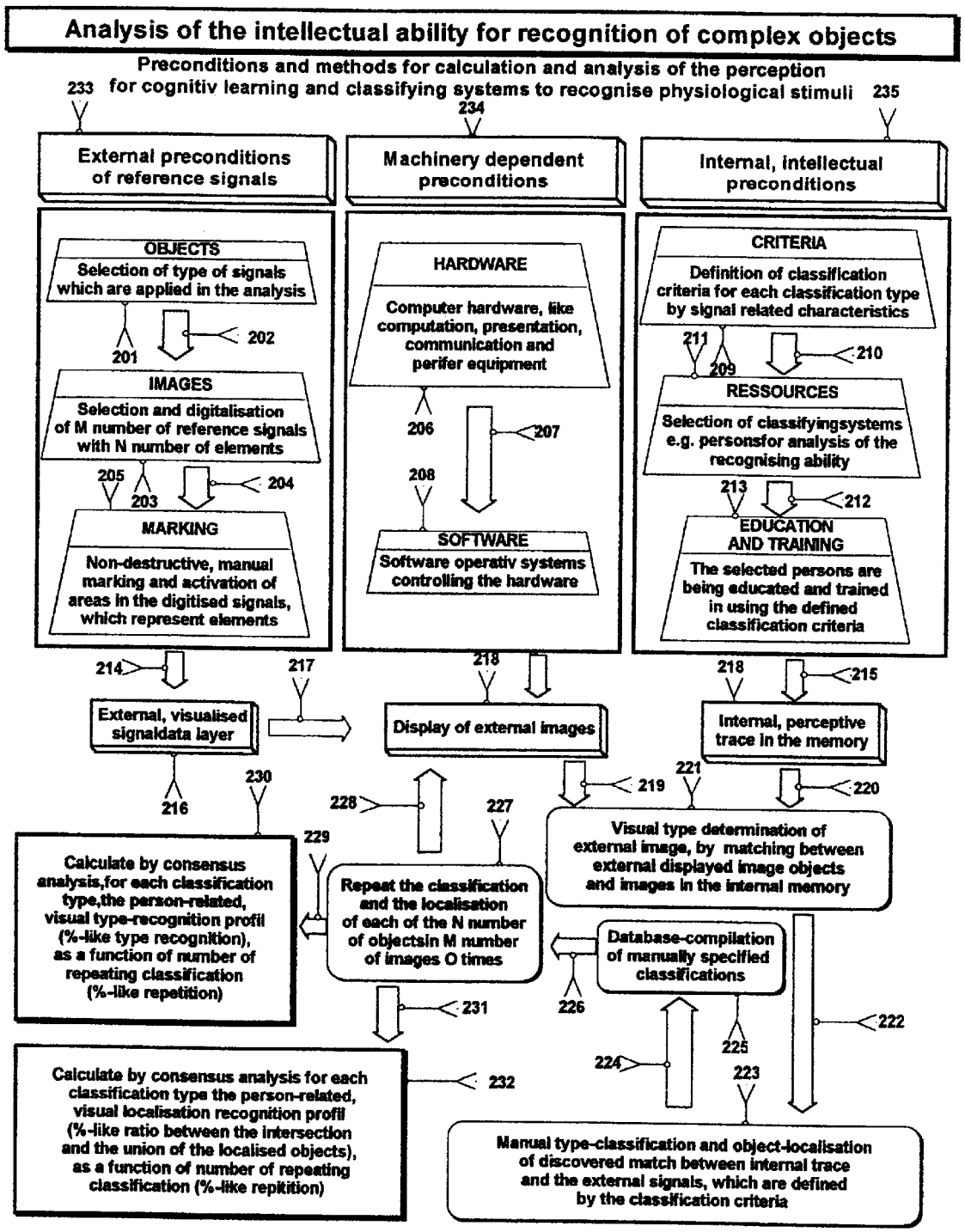

As shown in FIG. 2 and in FIG. 3, the method of the invention, as described in claim 1 is based upon procurement and use of three main resources, which are:

Procurement of the external signals, including selection of type of objects, selection and digitalisation of reference images and marking of the objects in the reference images (2A, 3A).

Procurement of the computer hardware environment and the operative system to execute the developed software for providing the information about the intellectual recognition otherwise not determinable (2B, 3B).

Procurement and use of human, intellectual resources. These resources are necessary for defining classification criteria for each type of object, for selecting the learning and classifying systems, and for educating and training learning systems in use of the classification criteria (2C, 3C).

To improve the determination of the visual recognition capability, the type recognising capability is further complemented by calculating the area recognising capability, as described in claim 1. This capability to recognise object is determined by calculating for each object, the ratio of the area between the intersection and the union of the outlined objects, which is one for a perfect, outlined localisation capability (FIG. 3 (334).

Provided, the same classification criteria are being practised, comparison of any combinations of classification sets can be carried out between different pairs of sets that may be between single sets, between consensus sets, or between single sets against consensus sets. This comparison can then be shown as two-dimensional histograms or so-called scatter plots as shown in FIG. 7. Thereby, any combinations of agreements in the diagonal of the scatter plot and disagreements outside the diagonal can be visualised and located, both quantitatively and qualitatively, as described in claim 2. In case, comparison of consensus sets are being carried out, set operations on the consensus sets like AND, OR, XOR, (A NOT B) and (B NOT A) can be carried out.

Further, using the same classification criteria, the classification performance of each person can now be ranked within the group in an individual ranking analysis by use of the individual consensus sets. This individual ranking analysis is carried out by multiplying the Sum of Performance Profiles (claim 1) with the total Classification Agreement (claim 2) for each individual and the group of individuals, as described in claim 3. Thus, the classification agreements between each person and the group are calculated.

By constructing group consensus classification sets from consensus sets of individual persons, it is possible to carry out a ranking analysis of several groups. This group ranking analysis is carried out by multiplying consensus of the classification sets for each group with the consensus set of all the groups, as described in claim 4.

An expert classification set may then be selected by the ranking procedure, as described in claim 5.

As described in claim 6, expert classification set may then function as filtration sets to retain all similar classified objects in the source set. Thereby, all matches of classifications between the expert sets and the filtrating set will be shown with a high reproducibility.

Single pass classifications of substructures or attributes of objects can be used to define new types of objects, by calculating the most common combination of classified substructures, as described in claim 7.

Visual comparison between pairs of classification sets can be displayed directly as symbols as an non-destructive overlay upon the objects. Thereby, both the objects and the pairs of classification sets are displayed simultaneously, as described in claim 8.

Education and training in visual classification can then be carried interactively and recursively by use of either selected or constructed expert classification sets, as described in claim 9.

Finally, any time-dependent changes by physical or chemical influences on the signals, represented by classified objects can be followed by use of expert, consensus classification sets, as described in claim 10.

The invention can now be explained with reference to the following figures:

FIG. 1. Shows the principal system configuration of the invention.

FIG. 2. Shows for recognition of physiological stimuli like images, the object classification of B number of objects in M number of images repeated T times.

FIG. 3. Shows for recognition of objects in digitised images, both the object classification and object area determination of B number of objects in M number of images repeated T times.

Figure 4:
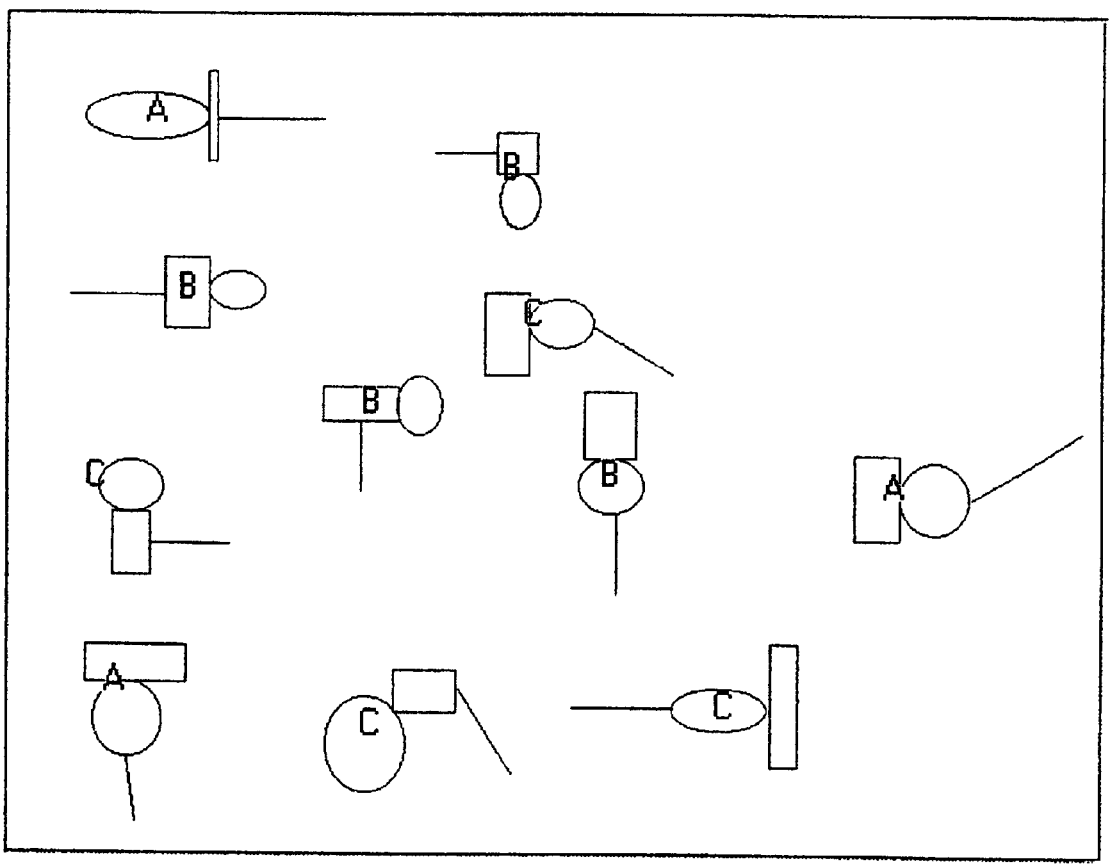

FIG. 4. Shows classification of different looking objects.

FIG. 5. Shows two tables, how to administrate and calculate the Sum of Performance Profiles.

FIG. 6. Shows an example of Performance Profiles calculated for ten different types of objects.

FIG. 7. Shows an example of a two-dimensional scatter plot calculated for ten different types of objects.

The purpose of the invention is to objectify by statistical analyses subjective classifications by repeatedly classification of reference signals, e.g. objects in digitised images.

In combination of a computer hardware system and a developed software system, the invention concerns a method as configured in FIG. 1 for visual knowledge transfer by knowledge networking. This networking activity will produce classification sets at four levels:

Level 1: A single classification set carried out by e.g. a person.

Level 2: Consensus set of several single sets carried out by e.g. a person.

Level 3: A group consensus set of consensus sets of several persons.

Level 4: A centre consensus set of consensus sets of groups.

All devices and processes in the networking system are important to achieve a converging agreement. However, only the here prescribed methods, which is embodied as a software system and implemented in the workstations (FIG. 1, item 110) as a new invention has the potential to carry out the knowledge transfer procedures. Moreover, the methods provide the users with information otherwise not accessible, whereby intellectual driven classifications of objects in e.g. digitised images can be improved. This improvement can be achieved, both by removing systematically errors and by selecting, continuously improved knowledge databases.

The methods are based on consensus analysis of object classification carried out by learning systems. Typically, the user will point out by a pointing device the objects and at the same time indicate the type of classification of the object. This information about the users interpretation of indicated objects is automatically saved to a databases. Subsequently, this information is then used for executing the claimed methods.

At the workstations as illustrated in FIG. 1, device 110, the analysis of the intellectual capability is then carried out as shown in FIG. 2 and FIG. 3, by an unequivocal correlation between the classification capability and the classification type.

By the known methods for consensus analysis, the classifications are carried out at the sample level without the options to indicate user-defined areas of interests. Thereby, mistaken objects can not be revealed. Moreover, no correlation between the classification capability and the classification type can be carried out.

What is claimed is:

1. A method for procuring information in an objective way about classifiers' consistency and agreement in iteratively classifying in a subjective way (m) pre-determined constructed classification sets of (n) pre-determined and marked classifications objects, comprising:

A) setting up a classification taxonomy including:
  i) for different defined types of visual classifications objects, a classification criterion is defined for each characteristic type of a classification object;
  ii) each classification criteria is named by a unique and selectable classification label, which is defined literary by a text and visually by a reference object;
  iii) the classification labels are organized into a classification taxonomy of related labels;
  iv) the classification taxonomy is electronically stored and displayed on a computer screen;

B) setting up (n) number of classification objects, including:
  i) a person or a computerized system is selecting a set of digitized images for marking a plurality set of classification objects;
  ii) a classification object is marked by a person or computerized system by creating marking objects pointing at or are encircling parts or all of one or more images in an image set;
  iii) using marking objects as variable pointers to access information about the dynamic object classifications, the marking objects are electronically stored as a data structure consisting of two fields: an address field, defining the location of a marked classification object as parts or all of one or more images; an identifier field, containing an assigned label selected by a classifier when classifying a marked object;

C) setting up (m) number of classification sets, including:
   i) (m) number of identical classification sets are setup manually or automatically by selecting for each classification set (n) number of the same marked classification objects as being defined in steps (B)(i)–(B)(iii); and
D) classifying (n) number of marked objects in (m) number of classification sets, including:
   i) displaying simultaneously the classification taxonomy consisting of organized classification labels, and for each classification label a reference object and a textual description of the reference object;
   ii) displaying for each of the (m) number of classification sets, (n) number of marked classification objects and a marking object for each of the (n) number of marked objects;
   iii) inspecting and interpreting by a classifying system according to a subjective understanding of the classification taxonomy, the marking objects in an image set, in attempt to carry out visual classification in a consistent way and in agreement with other classifying systems, who also are attempting to practising in a consistent way the same classification rules embodied in the classification taxonomy;
   iv) based on a subjective comparison carried out by a classifying system between interpreted inspections of marked classification objects and interpretation of the textual and visual definitions of classification types of objects embodied in the taxonomy, said classifying system is instructed to select the most appropriate label from the accessible classification taxonomy for each marked classification object, wherein the classifier believes that the selected classification label is identifying a classification type most alike the marked classification object;
   v) the classifying system is then assigning the selected classification label to the marking object, which identify and represent the interpreted classification object;
   vi) the assignment of the selected classification label to a marking object, is stored electronically;
   vii) for classifying all images sets in a classification set, steps (D)(i)–(D)(vi) are repeated for (n) number of classification objects;
   viii) for carrying out (m) number of classification sets, step (D)(vii) is repeated (m) times.

2. The method according to claim 1, further including displaying on a display device simultaneously the image set, the marked classification objects of the image set, the marking object in conjunction with one or more classification labels assigned by one or more classifying systems to the same marking objects.

3. The method according to claim 1, further including calculation of the intra-classifier variability in assigning different classification labels to the same marking objects, comprising:
   i) a majority set is being constructed by counting for (m) repeated classification sets carried out in step (D)(viii) the number of different selected labels assigned to the same marking objects;
   ii) for a constructed majority set, calculating for each classified object the labelization frequency for each assigned label in percentage of all labels assigned to the same marking object;
   iii) calculating for a majority set the arithmetic means, and the weighted average (Weighted Average Reproducibility, WAR) in relation to the total number of objects, which have been classified; and
   iv) calculating for a majority set the Performance Profiles for each assigned label by calculating in percentage an average ratio of similar labeled classification object as a graphic function of number of performed classification sets.

4. The method according to claim 1, further including carrying out and displaying in a two-dimensional histogram a concordance analysis of the classification agreement and disagreement between a selected classification set or a majority set and another classification set or majority set derived from the same classifier for an intra-classifier analysis or from different classifiers for an inter-classifier analysis said comparison is carried out for k-number of labels by qualitatively and quantitatively calculating all combinations of label-specific classification agreement and disagreement between the two sets in a two dimensional (k×k) histogram table, comprising:
   i) calculating and displaying for each of the (k×k) combination the classification agreement between the two sets as circles in the diagonal north-west/south-east, while the degree of the agreement is indicated relatively by the area of the circles;
   ii) calculating and displaying the classification disagreement between the two sets as circles outside the diagonal north-west/south-east, while the degree of the agreement is indicated relatively by the area of the circles;
   iii) calculating the sum of the circle areas in the diagonal agreement in percentage, in number of objects or as a kappa-value to indicate the classification agreement; and
   iv) calculating the sum of the circle areas outside the diagonal agreement in percentage, in number of objects or as a kappa-value to indicate the classification disagreement.

5. The method according to claim 3 using majority sets, wherein ranked lists of classification abilities for classifying systems are calculated by multiplying the intra-variability of the classifications carried out by a classifying system with the inter-variability agreement between the classifying system and the related working groups of classifying systems.

6. The method according to claim 4 using majority sets, wherein ranked lists of classification abilities for classifying systems are calculated by multiplying the intra-variability of the classifications carried out by a classifying system with the inter-variability agreement between the classifying system and the related working groups of classifying systems.

* * * * *